US012783633B2

(12) United States Patent
Sankaran et al.

(10) Patent No.: US 12,783,633 B2
(45) Date of Patent: Nov. 3, 2026

(54) EVENT LOG-BASED ATTESTATION FOR DISTRIBUTED EDGE DEVICES

(71) Applicant: Zededa Inc., San Jose, CA (US)

(72) Inventors: Hariharasubramanian Cinthamani Sankaran, Bengaluru (IN); Erik Nordmark, Mountain View, CA (US)

(73) Assignee: Zededa Inc., San Jose, CA (US)

( * ) Notice: Subject to any disclaimer, the term of this patent is extended or adjusted under 35 U.S.C. 154(b) by 109 days.

(21) Appl. No.: 18/759,684

(22) Filed: Jun. 28, 2024

(65) Prior Publication Data

US 2025/0355987 A1 Nov. 20, 2025

Related U.S. Application Data

(63) Continuation-in-part of application No. 18/669,432, filed on May 20, 2024, now Pat. No. 12,579,272.

(51) Int. Cl.
*G06F 21/00* (2013.01)
*G06F 21/44* (2013.01)
*G06F 21/60* (2013.01)

(52) U.S. Cl.
CPC ............ *G06F 21/44* (2013.01); *G06F 21/602* (2013.01)

(58) Field of Classification Search
None
See application file for complete search history.

(56) References Cited

U.S. PATENT DOCUMENTS 8,782,435 B1 7/2014 Ghose
10,762,183 B1 * 9/2020 Charan .................. G06F 21/40
12,033,006 B1 7/2024 Nair et al.
2013/0198838 A1 8/2013 Schmidt et al.
2018/0067845 A1 * 3/2018 Costello, Jr. ........ G06F 11/3688
2019/0206090 A1 7/2019 Ray et al.
2020/0167474 A1 5/2020 Goldman et al.
2021/0107141 A1 4/2021 Shrivastava et al.
2021/0326736 A1 10/2021 Kishimoto et al.
(Continued)

FOREIGN PATENT DOCUMENTS

CN 113627735 A * 11/2021 ......... G06Q 10/0635

OTHER PUBLICATIONS

EVE Edge Virtualization Engine, https://lfedge.org/projects/eve/, retrieved on Sep. 23, 2024, 8 pages.
(Continued)

*Primary Examiner* — Andrew J Steinle
(74) *Attorney, Agent, or Firm* — Raubvogel Law Office

(57) ABSTRACT

A computer-implemented method may be used to establish trustworthiness of an Edge Computing Device. The method may include, at one or more storage devices, storing expected values pertaining to aspects of the Edge Computing Device. The method may further include, at one or more hardware processing devices, receiving the expected values, receiving an Event Log from the Edge Computing Device, extracting actual values from the Event Log, and comparing the actual values with the expected values to determine whether the actual values match the expected values. The method may further include, at one or more communication devices, responsive to determining whether the actual values match the expected values, transmitting an indication of whether the Edge Computing Device is trustworthy.

45 Claims, 11 Drawing Sheets

(56) References Cited

U.S. PATENT DOCUMENTS

| | | | |
|---|---|---|---|
| 2022/0292221 | A1 * | 9/2022 | Sohail .................. H04L 63/105 |
| 2023/0318950 | A1 | 10/2023 | Davies-Barrett et al. |
| 2025/0356017 | A1 | 11/2025 | Jalayeri et al. |

OTHER PUBLICATIONS

Trusted Computing Group, "TPM 2.0 Library specification", https://trustedcomputinggroup.org/resource/tpm-library-specification/, retrieved on Sep. 23, 2024, 12 pages.

* cited by examiner

400

| PCR Index | PCR Usage |
|---|---|
| 0 | SRTM, BIOS, Host Platform Extensions, Embedded Option ROMs, and PI Drivers |
| 1 | Host Platform Configuration |
| 2 | UEFI Driver and Application Code |
| 3 | UEFI Driver and Application Configuration and Data |
| 4 | UEFI Boot Manager Code (usually the MBR) and Boot Attempts |
| 5 | Boot Manager Code Configuration and Data (for use by the Boot Manager Code) and GPT / Partition Table |
| 6 | Host Platform Manufacturer Specific |
| 7 | Secure Boot Policy |
| 8-15 | Defined for Use by the Static OS |
| 16 | Debug |

*FIG. 4*

EVENT LOG-BASED ATTESTATION FOR DISTRIBUTED EDGE DEVICES

CROSS-REFERENCE TO RELATED APPLICATION

This application claims priority as a continuation-in-part of U.S. Utility application Ser. No. 18/669,432, filed on May 20, 2024 and entitled "Measured Boot and Attestation for Distributed Edge Devices in Air-Gapped Environments", which is incorporated by reference as though set forth herein in its entirety.

TECHNICAL FIELD

The present document relates to security for computing devices such as IoT Edge gateways.

BACKGROUND

A "Distributed Edge" may be a network in which client data is processed at the periphery of the network, for example, close to the origin of the data. An "Edge Computing Device" may be a device that provides an entry point into an enterprise or service provider core network such as a Distributed Edge. An Edge Computing Device in a Distributed Edge may be referred to as a Distributed Edge Device.

An Internet of Things gateway, or "IoT gateway," is one type of Edge Computing Device, and may be a physical device and/or virtual platform that connect sensors, IoT modules, and/or smart devices to a network such as the Internet. An IoT gateway may collect and/or transmit data to other devices in the network. An "Edge Orchestrator" may be a hardware and/or software resource that manages and/or coordinates the flow of resources between multiple types of devices, infrastructure, and network domains in a Distributed Edge.

A "Trusted Controller" may be a device on a network for which trustworthiness has been established. A Trusted Controller may be used to update, modify, control, and/or verify trustworthiness of another device, such as an Edge Computing Device. An Edge Orchestrator may run on a Trusted Controller.

Proving trustworthiness is a common requirement for distributed systems in general, but it becomes even more important for geographically remote systems like IoT Edge gateways, as there is often no physical perimeter security for these devices. The unique operational requirements of Edge gateways, and the attack possibilities associated with them, include:

1. In some deployments, Edge Computing Devices at the Distributed Edge may operate in geographically remote locations, such as on top of wind turbines or in mid-ocean oil extraction zones, where manual access to the device is limited. In such deployments, the only way to get operational information about the Edge Computing Device at the Distributed Edge may be by having each Edge Computing Device at the Distributed Edge, itself, ship its operational state to the Trusted Controller. Thus, providing visibility of the operational status of the device to the Trusted Controller at any time is helpful. Even if there is an attack and the software running on an Edge Computing Device at the Distributed Edge has been modified, it may be helpful if the Edge Computing Device, itself, is able to detect and report such an incident to the Trusted Controller.

2. In some deployments, Internet connectivity and/or power supply are not reliable. There can be intermittent loss of connectivity between Edge Computing Devices at the Distributed Edge and the Trusted Controller, and an Edge Computing Device at the Distributed Edge may be expected to continue operating with the last-known configuration until it is able to reach the Trusted Controller again. There can be power outages as well. Once power is back online, the Edge Computing Device at the Distributed Edge may be expected to boot up, return to its last operational state, and resume its Edge Container Instances (even if connectivity is still down).
3. Some Edge Computing Devices at the Distributed Edge may also be deployed at locations where the device is prone to security attacks, such as on a smart pole, on an industrial factory floor, and/or the like. Such Edge Computing Devices at the Distributed Edge can be easily attacked by inserting USB drives, or the device itself can be physically hijacked to a different location for possible extraction of user data.
4. For Edge Computing Devices at the Distributed Edge, software upgrades are typically done remotely from the Trusted Controller. Ensuring integrity of the upgrade in a zero-trust environment is a challenge. It may be important to determine whether Edge Computing Devices at the Distributed Edge are running the correct software version.

These challenging environmental conditions and deployment requirements bring in their own set of security attack possibilities. Examples include:

1. Physical attacks, such as booting from a USB key with modified software, installing firmware rootkits, or altering the device's hardware configuration by adding an unauthorized PCI peripheral or removing an existing PCI device;
2. Attacks over the network, such as modifying operating system (OS) partitions to boot a different and potentially modified and/or malicious version of the software running on the Edge Computing Device at the Distributed Edge;
3. An attempt to steal the device and operate it in a different location, for off-line hacking, in an attempt to decrypt the encrypted volumes stored on the device by booting different, malicious software; and
4. Use of a malicious software version that boots up and mimics the legal version expected by the Trusted Controller to extract the latest configuration from the Trusted Controller, which may contain secretive information like cloud storage credentials, sensitive user data such as cloud configurations for a Edge Container Instance, and/or the like.

SUMMARY

Described herein are various techniques for securing Edge Computing Devices. In some implementations, Edge Computing Devices at the Distributed Edge may maintain operational availability in the diverse conditions outlined above, and at the same, may support a security framework to detect and mitigate the security challenges outlined above. In some cases, the Edge Computing Device may accomplish one or more of the following objectives:

1. Measure the boot chain of Edge Computing Devices at the Distributed Edge;

2. Detect any discrepancies in the boot chain and disallow access to sensitive resources in Edge Orchestrator (such as credentials);
3. Allow Edge Computing Devices at the Distributed Edge to access encrypted information, as long as the measurements do not change, perhaps after reboots, even when the Trusted Controller is not reachable; and/or
4. Have a self-locking mechanism to restrict access to encrypted volumes in case of a change in the boot chain, even during offline operation.

According to some embodiments, a computer-implemented method may be used to establish trustworthiness of an Edge Computing Device through the use of platform configurable registers (PCRs), which are memory locations within a TPM system with unique properties, such as the need for a special command to modify values stored in the PCRs. The method may include, at one or more storage devices, storing expected values pertaining to aspects of the Edge Computing Device. The method may further include, at one or more hardware processing devices, receiving the expected values, receiving an Event Log from the Edge Computing Device, extracting actual values from the Event Log, and comparing the actual values with the expected values to determine whether the actual values match the expected values. The method may further include, at one or more communication devices, responsive to determining whether the actual values match the expected values, transmitting an indication of whether the Edge Computing Device is trustworthy.

Determining whether the actual values match the expected values may include determining that the actual values match the expected values. Transmitting the indication may include indicating that the Edge Computing Device is trustworthy. The method may further include, at the one or more communication devices, responsive to transmitting the indication, transmitting secret information stored on the Edge Computing Device.

The method may further include, prior to receiving the expected values, at the one or more communication devices, receiving the expected values from the Edge Computing Device, and, at the one or more storage devices, storing the expected values.

Storing the expected values may include generating a database of expected measurement digests of one or more of a GRUB binary of each released operating system version of the Edge Computing Device, a kernel command line of each released operating system version of the Edge Computing Device, a kernel rootf of each released operating system version of the Edge Computing Device; and an initrd binary of each released operating system version of the Edge Computing Device.

Generating the database of expected measurement digests may include, for each released operating system version of the Edge Computing Device, storing SHAs of the GRUB and kernel of the released operating system version. Each of the SHAs may be signed by a GPG key.

Generating the database of expected measurement digests may include, for each released operating system version of the Edge Computing Device, storing UEFI SHAs, by user configuration, of the released operating system version, and comparing the actual values with the expected values may include comparing UEFI measurements of the Event Log with the UEFI SHAs.

The method may further include, prior to receiving the expected values, at the one or more communication devices, receiving additional expected values from a plurality of additional Edge Computing Devices, at the one or more hardware processing devices, generating a database including the expected values and the additional expected values, and at the one or more storage devices, storing the database.

Generating the database may include organizing the expected values and the additional expected values according to properties of the Edge Computing Device and the additional Edge Computing devices, selected from the group consisting of a device model of the Edge Computing Device and the additional Edge Computing devices, a UEFI version of the Edge Computing Device and the additional Edge Computing devices, and an EVE version of the Edge Computing Device and the additional Edge Computing devices.

Extracting actual values from the Event Log may include extracting one or more of a UEFI digest of the Edge Computing Device, a GRUB digest of the Edge Computing Device, a kernel digest of the Edge Computing Device, and a GRUB command lines digest of the Edge Computing Device.

The method may further include, at the one or more communication devices, receiving a PCR quote from the Edge Computing Device. The PCR quote may contain one or more platform configurable register (PCR) values from the Edge Computing Device. The method may further include, at the one or more storage devices, storing the PCR quote.

The method may further include, at the one or more communication devices, transmitting a nonce, and, at the one or more communication devices, responsive to transmission of the nonce, receiving a signed PCR quote confirming trustworthiness of the PCR quote.

The method may further include, at the one or more hardware processing devices, replaying events in the Event Log to compute expected PCR values, comparing the expected PCR values with the one or more PCR values of the PCR quote to determine that the expected PCR values match the PCR values, and, responsive to determining that the expected PCR values match the PCR values, determining that the Event Log is trustworthy.

The method may further include, prior to comparing the actual values with the expected values, receiving a prior PCR quote containing one or more prior platform configurable register (PCR) values, comparing the PCR values with the prior PCR values to determine that the PCR values do not match the prior PCR values and, responsive to determining that the PCR values match the prior PCR values, determining that the actual values are to be compared with the expected values.

Comparing the actual values with the expected values may include determining that the actual values do not match the expected values. The method may further include, at an output device, responsive to determining that the actual values do not match the expected values, providing output indicating a mismatch, and, at an input device, receiving user input approving attestation. Transmitting the indication may include indicating that the Edge Computing Device is trustworthy.

The method may further include applying machine learning to the user input and to additional user input from additional attestation requests to generate a recommendation, and, at an output device, providing additional output indicating an additional mismatch in an additional attestation request and presenting the recommendation by indicating whether the additional attestation request should be accepted.

Further details are provided below.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 4 is a table depicting exemplary PCR number allocations for each element of the stack, according to one embodiment.

DETAILED DESCRIPTION OF THE EMBODIMENTS

The techniques described herein provide a system and method for ascertaining the trustworthiness of a computing device, such as an Edge Computing Device at a Distributed Edge of a network. The system and method provided herein may be sufficiently robust to use in air-gapped environments, in which system connectivity and/or power are only intermittently available.

System Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, a router, a switch, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Figure 1:
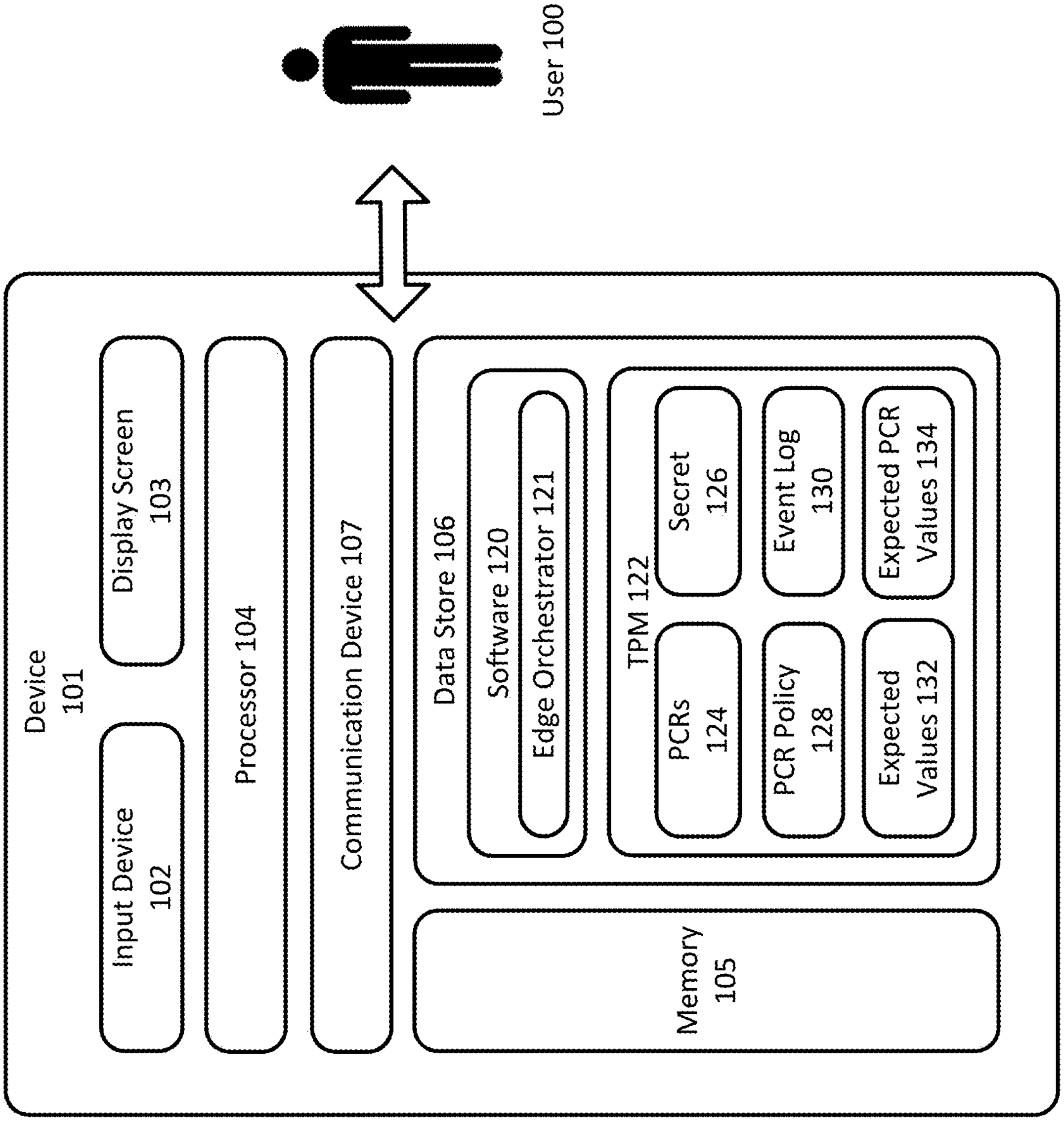
FIG. 1 is a block diagram depicting a hardware architecture for implementing the techniques described herein according to one embodiment.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device, and in some embodiments, may be an Edge Computing Device or "Edge Node" at the Distributed Edge of a network.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store datasets such as software 120, which may include firmware, BIOS, a boot loader, an operating system, Edge Orchestrator 121, and/or the like. Data store 106 may further include a trusted platform module (TPM) 122, which may store various components such as platform configurable registers (PCRs) 124, secret information 126 that is to be protected, one or more PCR policies 128, Event Log 130, expected values 132, expected PCR values 134, and/or the like. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, California) and/or Amazon Simple Storage Service (Amazon S3) (available from Amazon.com of Seattle, Washington).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into data store 106 that is detachable, and later displayed after data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label is also stored along with each data entry, to be displayed along with each data entry.

Display screen 103 can be any element that displays information such as text and/or graphical elements. In particular, display screen 103 may present a user interface for entering, viewing, configuring, selecting, editing, downloading, and/or otherwise interacting with datasets as described herein. In at least one embodiment where only some of the desired output is presented at a time, a dynamic control, such as a scrolling mechanism, may be available via input device 102 to change which information is currently displayed, and/or to alter the manner in which the information is displayed. In at least one embodiment, display screen 103 can be omitted or functionally combined with one or more other components.

Processor 104 can be a conventional microprocessor for performing operations on data under the direction of software, according to well-known techniques. Memory 105 can be random-access memory, having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

In some embodiments, device 101 may be an Edge Computing Device acting as part of a Distributed Edge network. Device 101 may be constantly connected to other devices in the network, or may be only intermittently connected, or even continuously disconnected ("air-gapped").

Figure 2:
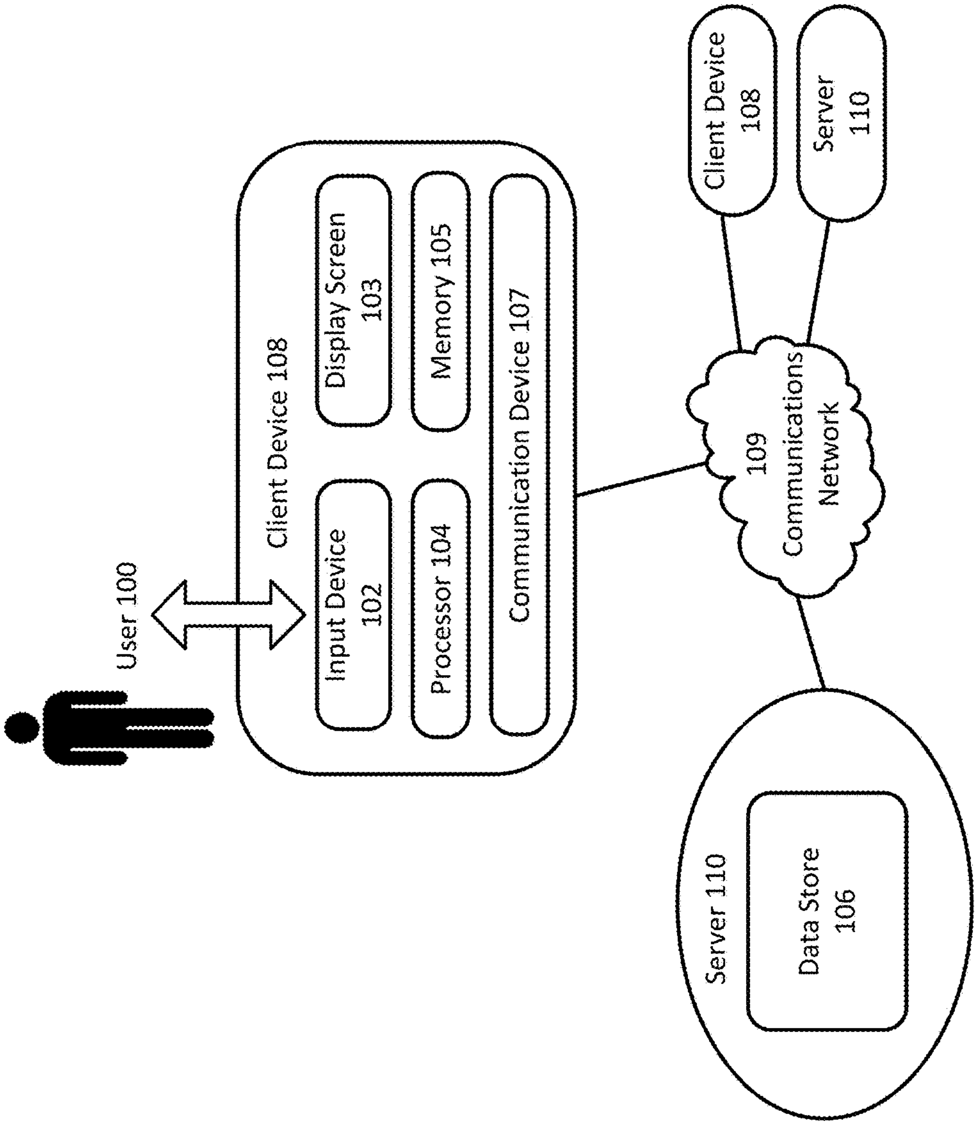
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server **11*o*** containing the requested data. Such requests may be sent via HTTP as remote procedure calls or the like.

In some embodiments, client device 108 may be an Edge Computing Device acting as part of a Distributed Edge network. Like device 101, client device 108 may be constantly connected to other devices in the network, or may be only intermittently connected, or even air-gapped.

In one implementation, server no is responsible for data storage and processing, and incorporates data store 106. Server no may include additional components as needed for retrieving data from data store 106 in response to requests from client device 108.

As described above in connection with FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store datasets, including but not limited to software 120, TPM 122, PCR's 124 secret information 126, PCR policy 128, Event Log 130, expected values 132, expected PCR values 134, and/or the like; alternatively, such data can be stored elsewhere (such as at another server) and retrieved as needed.

In addition to or in the alternative to the foregoing, data may also be stored in data store 106 that is part of client device 108. In some embodiments, such data may include elements distributed between server **11*o* and client device 108** and/or other computing devices in order to facilitate secure and/or effective communication between these computing devices.

As discussed above in connection with FIG. 1, display screen 103 can be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. Communication device 107 may communicate with other computing devices through the use of any known wired and/or wireless protocol(s), as discussed above in connection with FIG. 1.

In one embodiment, some or all of the system can be implemented as software written in any suitable computer programming language, whether in a standalone or client/ server architecture. Alternatively, some or all of the system may be implemented and/or embedded in hardware.

Notably, multiple client devices 108 and/or multiple servers 110 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2. As indicated above, device 101 and/or client device 108 may be intermittently and/or continuously air-gapped from other network devices. As such, communication between device 101 and/or client device 108 and other network resources may, when necessary, be via manual measures, such as connection of a portable storage device such as a USB drive.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown). Part of data store 106 may reside on device 101 and/or client device 108, which may be air-gapped from other network resources as described previously.

In one embodiment, some or all components of the system can be implemented in software written in any suitable computer programming language, whether in a standalone or client/server architecture. Alternatively, some or all components may be implemented and/or embedded in hardware.

TPM Measured Boot

In pre-existing solutions, attestation may be handled by measuring the boot chain (explained below) of Edge Computing Devices at the Distributed Edge, and allowing access to select resources in the Controller only on the basis of attestation of these measurements. Since any software can be potentially modified, such measurement architectures may use a hardware-based root of trust (HRoT) or a Trusted Execution Environment (TEE). The following sections describe how measured boot may function, and how pre-existing attestation solutions may evaluate the measurement values before deciding to approve or disapprove a presented attestation request. Various parts of the solution are described at both the Edge Device and at the Edge Controller.

"Measured boot" is a boot sequence starting at a Root of Trust for Measurement or RTM (i.e. BIOS Initial Boot Block), initiating a series of measurements including measurements of all security-relevant components (for example, firmware, BIOS, Option ROMs, boot loader, root filesystem, operating system, and/or the like). The measurements may be stored in PCRs 124 of TPM 122.

PCR 124 may be a memory register inside TPM 122 that can store the output of a hash algorithm. TPM 122 may come equipped with 24 PCR slots. TPM PCRs 124 may have a set of unique properties. In at least one embodiment, it may not be possible to reset or directly write to these memory registers; rather, the result of an Extend operation may be written to PCR 124. In at least one embodiment, PCR registers 124 may be set to their fixed initial value only at power on or system reset.

An "Extend operation" is the process of calculating a new value for PCR 124 by combining the input value with current PCR value 124 through a cryptographic operation (typically a hash function). The result becomes the new value of PCR 124. The following is an exemplary PCR Extend operation:

$$\text{New\_PCR\_Value}[i] = SHA\text{-}256(\text{Old\_PCR\_Value}[i] \,||\, \text{Input\_Digest})$$

Here, the || indicates concatenation.

A "measurement" may be created by computing a hash (digest) of the next content that affects the boot process and storing and/or extending it into PCR 124. The measured data can be code (such as BIOS, UEFI, or Firmware code) or configuration data (such as kernel boot parameters).

For example, at system power on, before transferring the execution flow to the next stage, processor 104 may first measure the BIOS/UEFI binary executable code and configuration data by storing and/or extending their digest (cryptographic hash such as SHA256) into PCR 124. BIOS/UEFI, and subsequent stages may perform the same measurement process before transferring the execution flow to the next stage. This process is called "Measured Boot."

The aforementioned Extend operation may ensure that the value of each measurement relies on the previous value to achieve a property called stream integrity. This way, measurements may form a chain, so that any changes in measurement output of one stage of the boot process will propagate into the next ones, resulting in a different set of PCR values 124 at the end.

At the end of the measured boot process, the system may be provided with a set of PCR values 124, the result of performing extended operation on data that was measured. These values may be used for local access policy checks and/or remote attestation.

Exemplary Boot Chain for TPM Measured Boot

Figure 3:
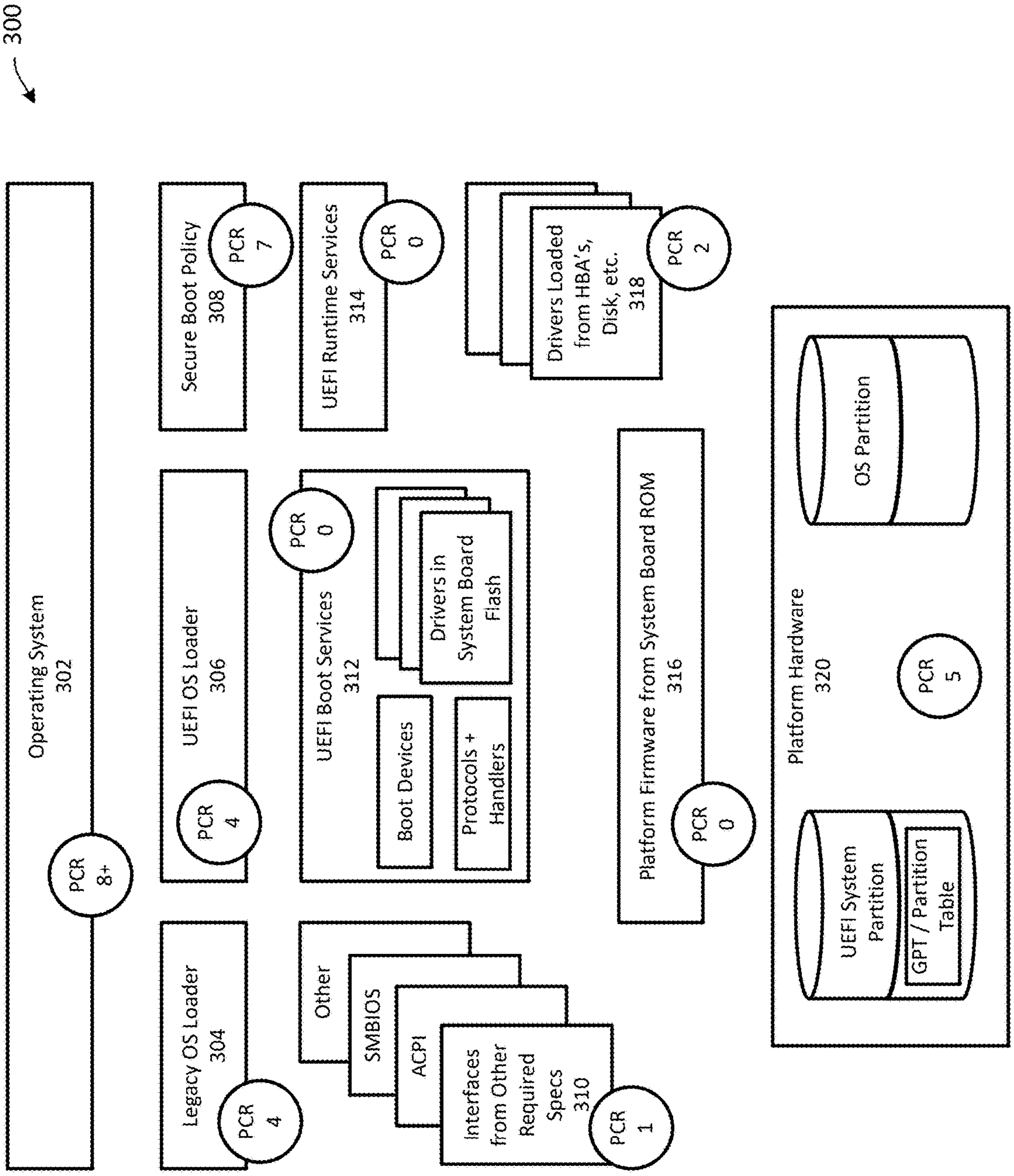
FIG. 3 is a block diagram depicting the stack of a representative boot chain of a software system according to one embodiment.

FIG. 3 is a block diagram depicting a stack 300 of a representative boot chain of a software system according to one embodiment, for example, as specified by a PC specification provided by Trusted Computing Group. As shown, stack 300 may include Operating System 302, Legacy OS Loader 304, UEFI OS Loader 306, Secure Boot Policy 308, Interfaces from Other Required Specs 310 (for example, ACPI, SMBIOS, etc.), UEFI Boot Services 312 (which may include Boot Devices, Protocols, Handlers, and/or Drivers in a System Flash Board), UEFI Runtime Services 314, Platform Firmware from a System Board ROM 316, Drivers Loaded from HBAs, disk, etc. 318, and/or Platform Hardware 320. Platform Hardware 320 may include a UEFI Partition System, GPT Partition Table, and/or OS Partition.

The Boot chain may refer to the chain of software block-loaded in sequence, one on top of another, from the UEFI (i.e. the booting firmware), all through the Boot Loader, Operating System Kernel and the root filesystem. Measured Boot is the process of measuring each of these layers and recording their digest values in Platform Configuration Registers (PCR) inside TPM, as the system goes through the boot sequence. Each PCR number is allocated for measuring a certain block in the boot chain, as shown in FIG. 4.

FIG. 4 is a table 400 depicting exemplary PCR number allocations for each element of stack 300, according to one embodiment. This allocation is merely one example. A sample set of PCR values taken from a real device running TPM 2.0, after the bootup session is complete, is shown below:

```
PCR0 Value: x4F76158CCCB17A4E0F4A8DD5814958035EB424227958F3E2C05F241A2A7781CD
PCR1 Value: xE4AE4DFEF23E38DF3B7527AEEB07EDC1199A8FCC03896C95E258FDADE1A1A836
PCR2 Value: x3D458CFE55CC03EA1F443F1562BEEC8DF51C75E14A9FCF9A7234A13F198E7969
PCR3 Value: x3D458CFE55CC03EA1F443F1562BEEC8DF51C75E14A9FCF9A7234A13F198E7969
PCR4 Value: x27BFC43D61ABF7779945360CC23CD247C8F4410ED01D1C17745395D0B06F9F5E
PCR5 Value: x1402DDB12C47B59CA8E5CA68A9C5A09B8A438D62F5FE347933513FB167298050
PCR6 Value: x3D458CFE55CC03EA1F443F1562BEEC8DF51C75E14A9FCF9A7234A13F198E7969
PCR7 Value: xB5710BF57D25623E4019027DA116821FA99F5C81E9E38B87671CC574F9281439
PCR8 Value: xC53D4D2CFF797875A5BCE07DF25FC9AFF828F9FDC34CD79FAFD87AA17B70AC97
PCR9 Value: x0BE70BF0377971130EAC0FAB51BBCA34CAAEB4E46425BDD67BA40767575C6223
PCR10 Value: 0x0000000000000000000000000000000000000000000000000000000000000000
```

Event Log 130 may include items such as event type, event data, and a cryptographic hash representing the state at a specific point in time.

TPM Protected Resources and Access Control Policies

In addition to the measured boot, TPM 122 may allow storing a limited amount of information, such as secret information 126, in its non-volatile memory. TPM-stored objects may be protected using an authorization value, which may act as an access control policy. Such an authorization value may include, for example, a user-provided password, proving position of a cryptographic key, or output of the measured boot process.

In at least one embodiment, an authorization value may be generated by binding the release of a resource to the static value of a set of PCRs 124, known as PCR policy 128. This procedure may allow users to store a resource (such as an encrypted volume key) into TPM 122 by asking TPM 122 to bind its release to the recorded value of one or more selected PCRs 124 and reveal secret information 126 in the future only if future PCRs value 124 are equal to the one stored with the resource at its creation time. As mentioned previously, PCR values 124 are not forgeable, and PCR values 124 are directly linked to the measured boot. Accordingly, by using PCR policy 128, users may protect a resource and reveal it only if the system is booted to a trusted known-good-state (e.g. trusted PCRs value 124), otherwise it may be assumed the change in PCRs 124 are as result of a malicious activity and the protected resource may not be revealed.

The above-described process works well as long as there is no change in the boot measurements and resulting PCR values 124, but can be problematic in the case of a legitimate system update or similar situation. A system update can update parts of the system that are part of the measured boot (for example, a firmware or OS update to patch a vulnerability or add new features). The resulting mismatch (inequality) between new PCR values 124 and old PCR values 124 may cause the policy evaluation to fail, and release of protected resources may become impossible. To release the protected resource, the system may provide an option to revert to the previous state (vulnerable/featureless) or to perform an external assessment and approval process to restore and re-seal the protected resource under new PCR values 124. In at least one embodiment, a disk encryption key may be wrapped using a TPM key and backed up before such external assessment and approval process is performed. The latter option may require access to a remote controller and successful passing of an attestation process.

TPM Event Log

TPM Event Log 130 may be a record of measurements, which may capture information about the system's state and activities, including measurements of the boot process, firmware, and software components. Each entry in TPM Software Implementation at the Edge Device Known attestation solutions may include two parts: software implementation at the Edge Device (for example, device 101), and software implementation at the Edge Orchestration Service (which may run on the Trusted Controller, for example, server 110).

Figure 5:
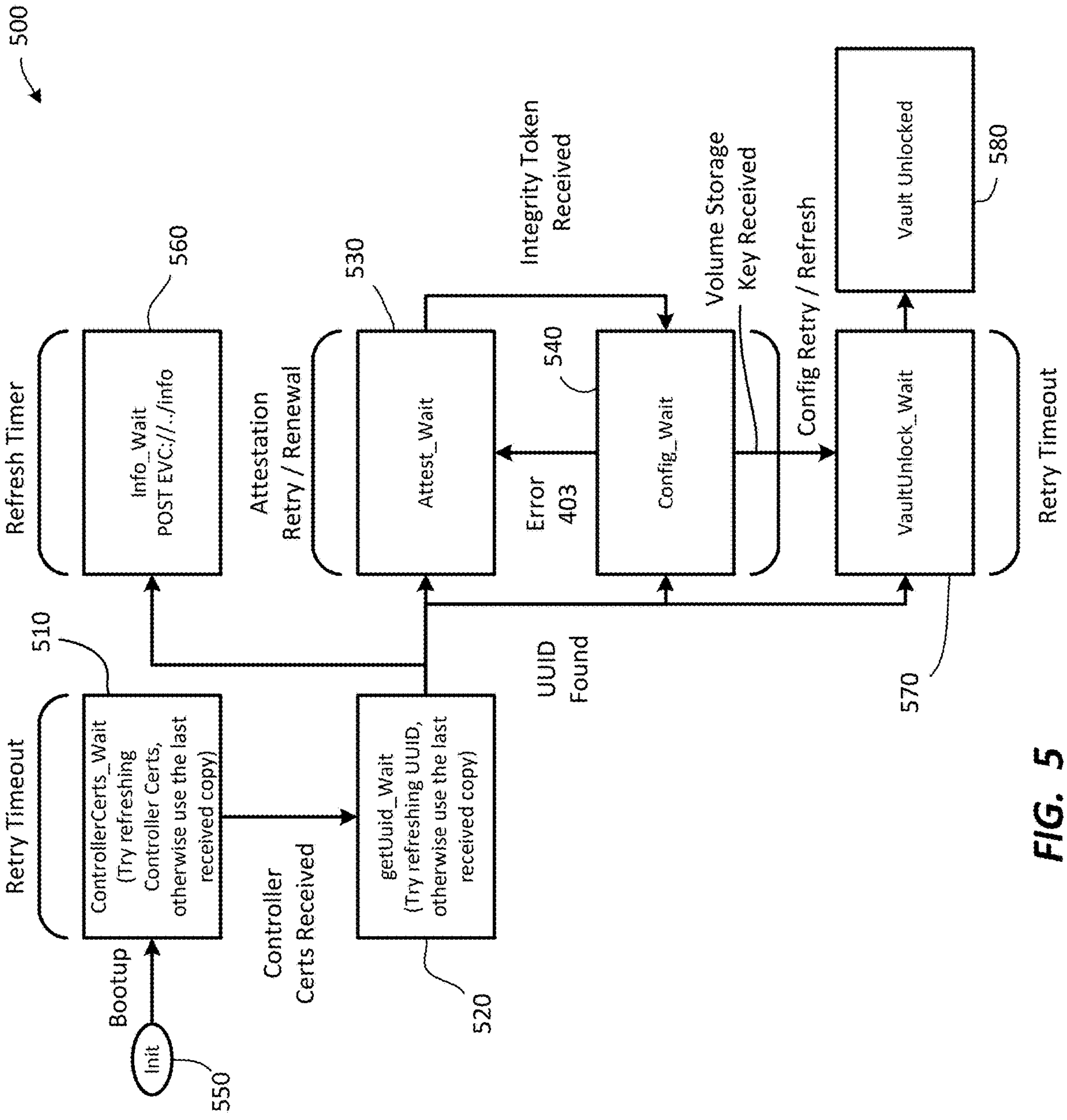
FIG. 5 is a flow diagram depicting attestation at the Edge Device, according to one embodiment.

FIG. 5 is a flow diagram depicting attestation **50*o* at the Edge Device, e.g., device 101 according to one embodiment. Attestation 500 may occur when the device 101 requests attestation from Edge Orchestrator 121**, and may include the following steps:

1. Attestation requesting software running on device 101 attempts to unseal the key, or obtain access to secret information 126, in TPM. If the attempt is unsuccessful, device 101 waits, in step 510, for encrypted Volume Storage Key from Edge Orchestrator 121, running on server no, published post-attestation by Edge Orchestrator 121 through configuration response. Device waits for UUID in step 520.
2. Whenever HTTP Error 403 is received from Edge Orchestrator 121, device 101 starts a new attestation cycle with Edge Orchestrator 121:
   a. First Attestation requesting software running on device 101 requests Edge Orchestrator 121 for a nonce to include in the PCR quote, as a freshness proof, and waits for the nonce in step 530.
   b. Then device 101 prepares a PCR quote with this nonce value as user-data, and waits for a response in step 540.
   c. Finally, device 101 sends attestation request with the following fields:
      i. PCR Quote (i.e., a copy of data in various PCR registries of TPM 122)
      ii. TPM Event Log 130
      iii. Image versions (Versions of Attestation requesting software running on the Edge Computing Device and the Firmware respectively)
3. Whenever an attestation response from Edge Orchestrator 121 is successful, device 101 waits in step 570 for access to secret information 126, and access is provided in step 580. Software on device 101 populates the Integrity Token (included in the reply from Edge Orchestrator 121 to attestation request), in a memory mapped file (not on the disk). Since Integrity Token is volatile, when device 101 reboots 550, this automatically triggers re-attestation.
4. If attestation fails, attestation is re-attempted periodically and device 101 waits for a response in step 560.
5. Configuration is requested in periodic intervals, with the Integrity Token (or without the Integrity Token, which will trigger an error code from Edge Orchestrator 121, forcing device 101 to re-attest).

6. Even if attestation is successful, Edge Orchestrator 121 can choose to invalidate Integrity Token periodically (say every few hours), to re-trigger attestation. Since Integrity Token is invalidated, by way of logic mentioned in the previous step, config request from attestation requesting software running on device 101 will receive the same error code in this case, which will re-trigger attestation.

Software Implementation at the Edge Orchestration Service

Verification of the attestation request (herein termed "attestation") from device 101 may be done by the Edge Management and Orchestrator service, using the following constructs, which are explained below.

1. Attestation Policy Configuration; and
2. Attestation Logic inside Edge Orchestrator 121.

"Attestation policy" may be synonymous with PCR policy 128, and may refer to the administrative control on the logic in the Edge Orchestrator 121, for validation of an incoming attestation request from device 101. Since Edge Computing Devices will have different versions of BIOS and Operating System and might be running on different hardware models, an example of such an attestation policy may include specifying expected SHA256 measurements (e.g., expected PCR values 134) for various software layers such as GRUB, kernel, and/or UEFI.

Attestation Policy in Edge Orchestrator

Figure 6:
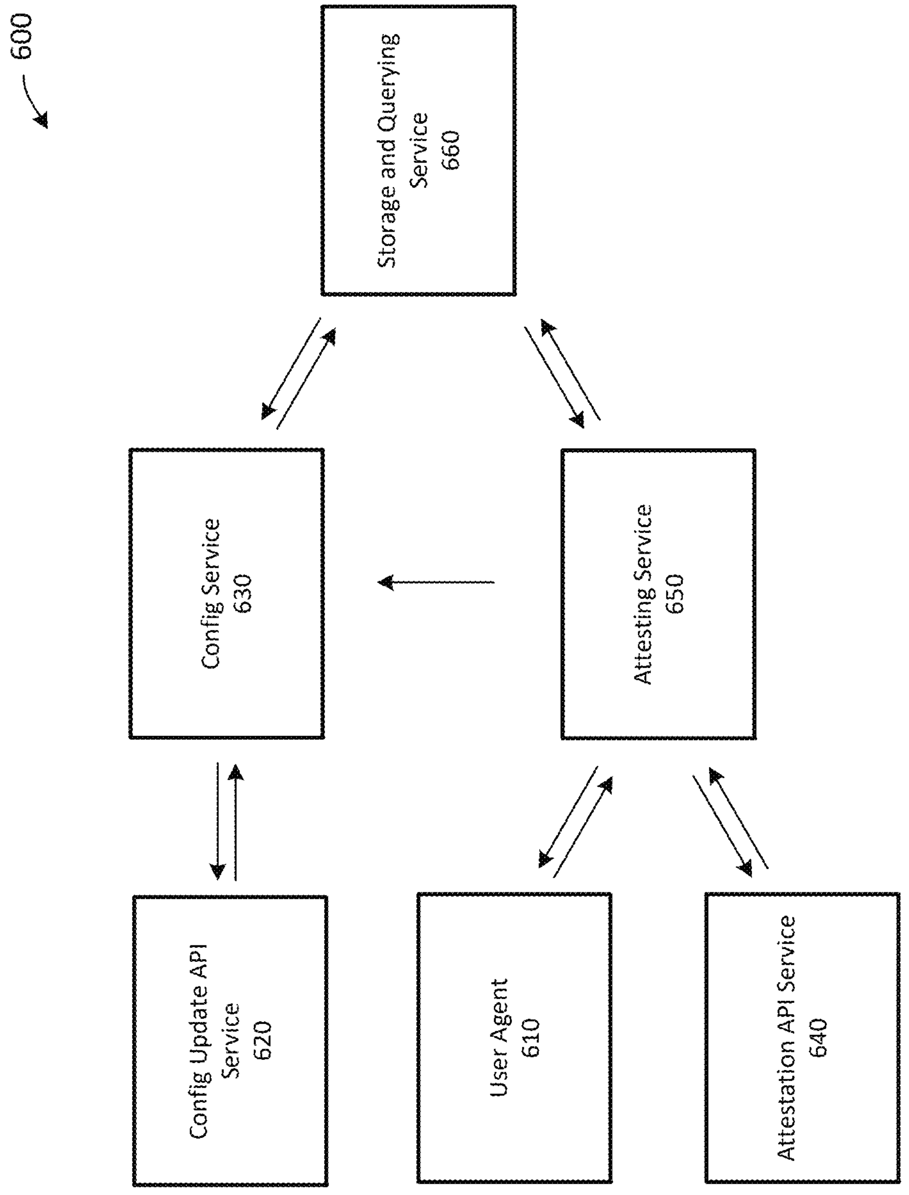
FIG. 6 is a schematic block diagram depicting logical flow of logical components inside an Edge Orchestrator, according to one embodiment.

FIG. 6 is a schematic block diagram depicting logical flow 600 of logical components inside Edge Orchestrator 121, according to one embodiment. An example implementation may involve the following:

a) User Agent 610—for example, a Command Line Interface, a Graphical User Interface, or a Web portal frontend, which takes input from the Admin, and invokes the API on the attesting microservice, potentially over a communication network;
b) Config Update API Service 620—a microservice receiving API requests for fetching latest config from device 101;
c) Config Update Service 630—a microservice responsible for servicing config update requests from devices 101;
d) Attestation API Service 640—a microservice responsible for receiving API requests for verifying and attesting software state of device 101;
e) Attestation Service 650—a microservice responsible for validating incoming attestation requests; and
f) Storage and Querying Service 660—Persistent Storage and Querying Interface, such as a microservice with SQL/NoSQL Databases as the data store.

Content of the Attestation Request from Edge Computing Device

An attestation request from the software running on device 101 may include, but is not limited, to the following:

1) A Quote from TPM, for the PCR values on the system (for example, some or all PCR values in TPM 122), with a Nonce provided from the Edge Orchestrator 121. The Nonce may be randomly generated by Edge Orchestrator 121, and may change for every Attestation cycle.
2) Event Log 130 (also termed "Measurement Log") as exported by TPM, for the boot session under attestation. This Event Log 130 may include a sequence of PCR extension events that lead to the final values of PCR (i.e., the current PCR values in TPM 122).
3) Version strings denoting the current versions of Firmware, GRUB, Linux Kernel, Application Software bundles.

Content of the Attestation Response from Edge Orchestrator

Figure 7:
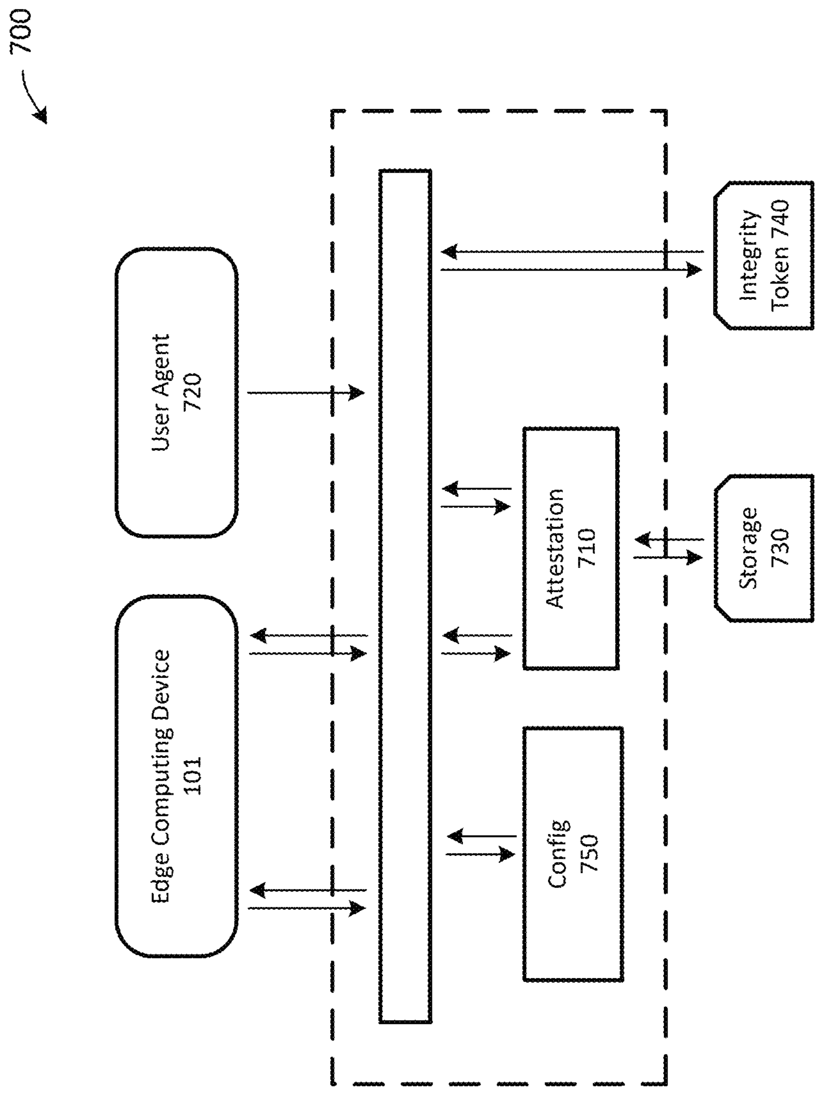
FIG. 7 is a state diagram depicting data flow in the attestation process, according to one embodiment.

The response to the attestation request, sent by Edge Orchestrator 121, may include, but is not limited to:

1) Attestation Response (Success or Failure); and
2) On successful attestation:
   a. Integrity Token; and
   b. Keys for Disk Decryption Flow of Attestation at the Attestation Service FIG. 7 is a state diagram 700 depicting data flow in the attestation process, according to one embodiment. According to some embodiments, the process of FIG. 7 may include the following steps:

1) Edge Computing Device, e.g., device 101, sends an attestation request of type with the payload mentioned in the previous section, to the Edge Orchestrator 121 (In some cases, it may first request a nonce).
2) API service forwards the attestation request to Attestation service 710. If device 101 is attesting for the first time, there will not be any baseline to compare against. In such a case, the attestation is rejected until there is an explicit user approval or pre-approval instructions from the user via user agent 720.
3) The reply to the attestation message is sent to API service. Attestation service 710 also generates an event for device 101 stating that the PCR values do not match (since there is no baseline). UI can also query and display the attestation status against device 101.
4) API service forwards the attestation "rejected" response to device 101. At this point, device 101 may continue retrying until the attestation request is successful.
5) An explicit approval request is sent by the user via user agent 720.
6) The approval request is sent to Attestation Service 710, which then marks the latest values it received as the new baseline.
7) Device 101 retries attestation.
8) Attestation Request reaches Attestation Service 710. This time, the values match the baseline. Attestation is deemed as successful.
9) Attestation service fetches storage keys from DB in storage 730 and returns back to device 101.
10) An integrity token 740 for device 101 is generated and an attestation success message is sent to API Service, which in turn forwards it to device 101.
11) The API service layer also caches the Integrity Token 740 in its local in-memory cache.
12) The attestation success message is sent to device 101.
13) Device 101 requests for Config Update Service 750 with the Integrity Token 740 it received after attestation. The request first reaches API service layer.
14) API service layer then checks its local cache to see if the Integrity Token 740 exists. If not, it will reject the request.
15) If the Integrity Token 740 is valid, the request is forwarded to Config Update Service 750.
16) Config Update Service 750 then responds with the configuration.
17) Configuration is sent to device 101.

Attestation Logic in Attestation Service

To validate an incoming attestation request, Attestation Service 710 may do the following:

1) To serve attestation requests, the Attestation Service 710 maintains a table of PCR templates (for example, expected PCR values 134).
2) Each PCR template has a set of SHA256 values, one for each of the measured PCR bank.
3) Optionally, one can configure a "wildcard" in place of the SHA256 value for any PCR bank, which will mean that any value will be accepted for that PCR bank in the attestation request.
4) For a given hardware model kind and given software version running on that hardware model, a set of PCR templates can be configured. For example, there could be device 101 of hardware type A. If it is running EVE OS 10.2.0, then the administrator could assign a set of PCR templates for {A, EVE OS 10.2.0} combination.
5) Upon receiving attestation request, Attestation Service will retrieve the PCR templates (for example, expected PCR values 134) based on the hardware model and software version reported in the attestation request, and compare the reported PCR values against each of the PCR templates, until either a complete match is found against a PCR template, or none of the PCR templates match.
6) If there is a match against at least one PCR template, then the attestation request is verified to be successful, and a storage key and Integrity Token 740 are released back in the attestation response. If there is no match against any of the PCR templates against that hardware model and software version, then an attestation failure message is generated as the response and sent back to device 101.

Summary of Existing Attestation Methods

Prior attestation methods may cover the following functionalities to secure access to sensitive information (e.g., secret information 126) stored on the persistent storage on the Distributed Edge Devices/Gateways:

1) End-to-End Implementation of Remote Attestation solutions involving headless devices, implementing the above logic, especially on the Edge Orchestrator 121;
2) A Disk encryption method on Edge Computing Devices, which relies on Edge Orchestrator 121 to release the decryption keys when there is a PCR change;
3) The concept of Integrity Token which is used by Edge Orchestrator 121 to enforce Attestation on an Edge Computing Device;
4) An implementation on Edge Orchestrator 121 which makes a valid Integrity Token a condition to honor incoming requests from Edge Computing Devices for fetching their latest config;
5) Logic of using an in-memory cache to optimize filtering of rogue/stale config requests by caching Integrity Tokens against the IDs of frequently seen Edge Computing Devices;
6) Implementation of a primitive Attestation Engine in Edge Orchestrator 121, by comparing the submitted PCR quote from Edge Device against a set of allowed PCR values for that device model, called PCR templates; and
7) Attestation Policy construct that is used by User-Agents to manage attestation of thousands of devices, using templating logic per {Model, UEFI, Software Version} as mentioned above.

Challenges with Existing Attestation Methods

Conventional attestation methods present several challenges, including but not limited to the following:

a) Wild carding a PCR in template completely ignores that PCR bank. Checking specific measurement events behind the final PCR value is not possible as only the final PCR value is checked. The whole PCR is either skipped or checked for a definite value. The user does not have flexibility to specify any intermediate value extended in a PCR.
b) Sometimes, for legitimate reasons, there could be slight variations in the PCR measurements among devices of the same hardware model. For example, there could be a slightly different arrangement of secondary storage, or a slight difference in the peripheral hardware which results in a different PCR value among those devices, even though they are of the same hardware model and are running the same Operating System version. Such differences may result in an unintended attestation failure.
c) To accommodate these variations and to allow for such variations during the attestation process, the user may need to create different model objects in the Edge Orchestrator 121 for each of these variants, and configure PCR templates for each of these models created per sub-variant of the original model. This can cause a model explosion in Edge Orchestrator 121, and may introduce a problem for the user to create and manage these sub variants, and configuring the right PCR templates for each of these models, and to associate each of the Distributed devices with their right model variant. Accomplishing this at scale can be complicated time-consuming, and/or error-prone.
d) Another option available for the user to address this requirement is, instead of creating new model object for each observed sub-variant, retain a single model, but configure more than one PCR template, and approve the attestation request as long as the submitted PCR values match any one of the configured PCR templates. The user in this case may have to create many PCR templates instead of models, and the attestation engine implementing this may be inefficient due to the time required to scan through all the PCR templates for a match, for every incoming attestation request matching that model.
e) There will typically be a massive number of attestation requests evaluated by this engine (in millions) over time, and an opportunity to build a predictive model based on training a machine learning model over this valuable labeled data set is not utilized.

Attestation Based on Deep Event Log Inspection

According to the present disclosure, the Attestation Engine may have an extensible and smarter way of approving a given software state represented by its PCR values. Specifically, the pre-existing Attestation Verifier logic is around templating PCR values. In other words the final PCR values should either match the value in the configured template or be wildcarded in the template. There may be one or more templates configured for a given model. While this works to some extent, it may not be an optimal way of managing the attestation logic because PCR values are hard to interpret; they do not reveal how the system ended up with those values in the PCRs. The system and method provided herein provide a deeper and smarter way of analyzing and approving attestation requests. An algorithm may be used to approve/disapprove an attestation request from a Distributed Edge based on its PCR quote and TPM 2.0 Event Log.

A sample extract from a real TPM 2.0 Event Log is presented below, which shows PCR 7 getting extended twice with two measurement events:

| Crypto Agile Format |
| --- |
| ...<stripped>... |
| ----Event 3---- |
| Type: EFI Variable Driver Config |
| PCR: 7 |
| Computed Hash: ce9ce386b52e099f3019e512a0d6062d6b560efe4ff3e5661c7525e2f9c263df |
| Data: UEFI_VARIABLE_DATA{ VariableName: {8be4df61-93ca-11d2-aa0d-00e098032b8c}, UnicodeName: "SecureBoot" } |
| Digest: ce9ce386b52e099f3019e512a0d6062d6b560efe4ff3e5661c7525e2f9c263df |
| ----Event 4---- |
| Type: EFI Variable Driver Config |
| PCR: 7 |
| Computed Hash: 64750445aba874519c0627e4275e09b5dd20ae80c406cc4ed0dd76eba133ac18 |
| Data: UEFI_VARIABLE_DATA { VariableName: {8be4df61-93ca-11d2-aa0d-00e098032b8c}, UnicodeName: "PK" } |
| Digest: 64750445aba874519c0627e4275e09b5dd20ae80c406cc4ed0dd76eba133ac18 |
| ...<stripped>... |

This disclosure presents a mechanism to examine the measurements extended into a PCR and selectively check a particular set of measurement events and approve/disapprove the PCR quote based on those measurements.

Figure 8:
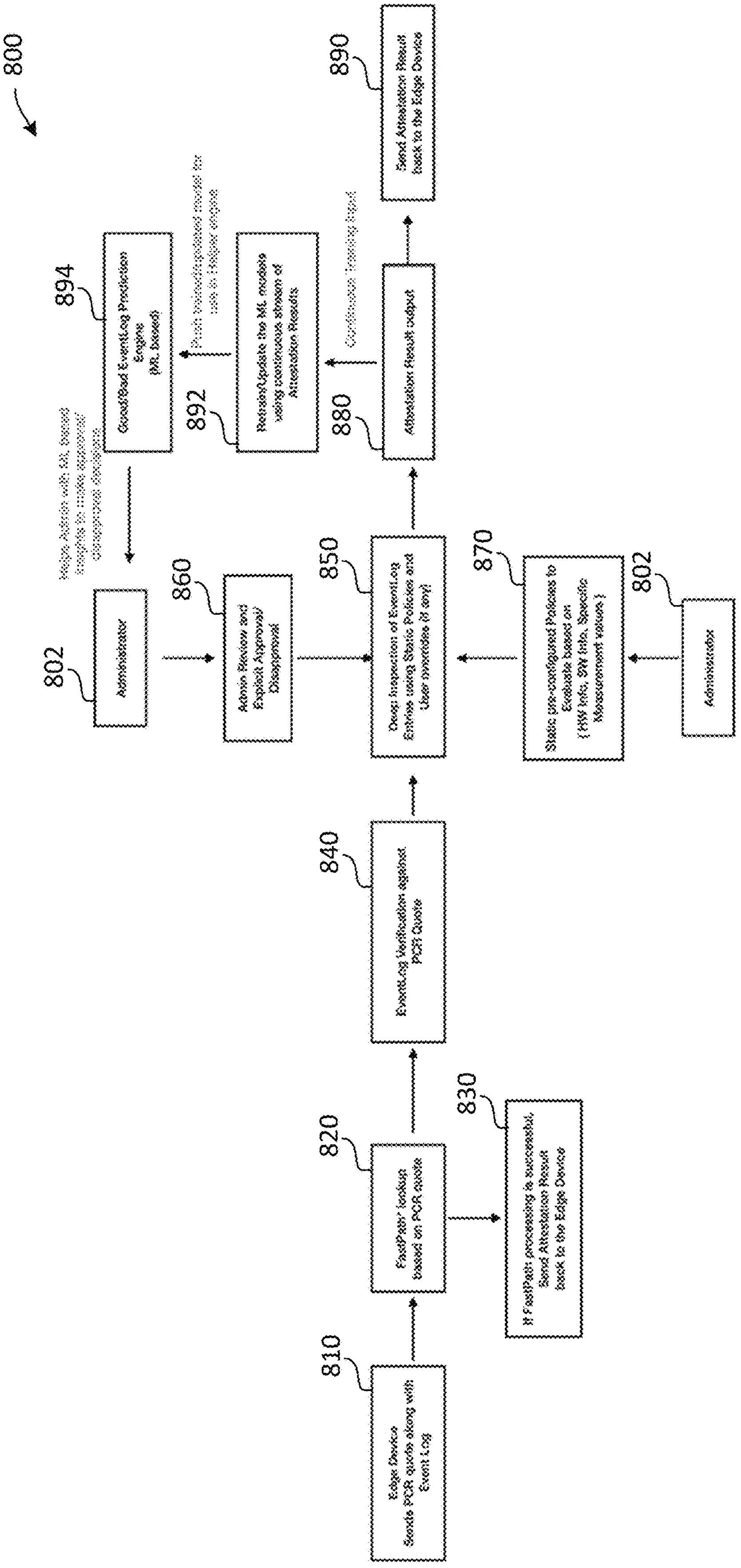
FIG. 8 is a flow diagram depicting an overview of an attestation method according to one embodiment.
Figure 9:
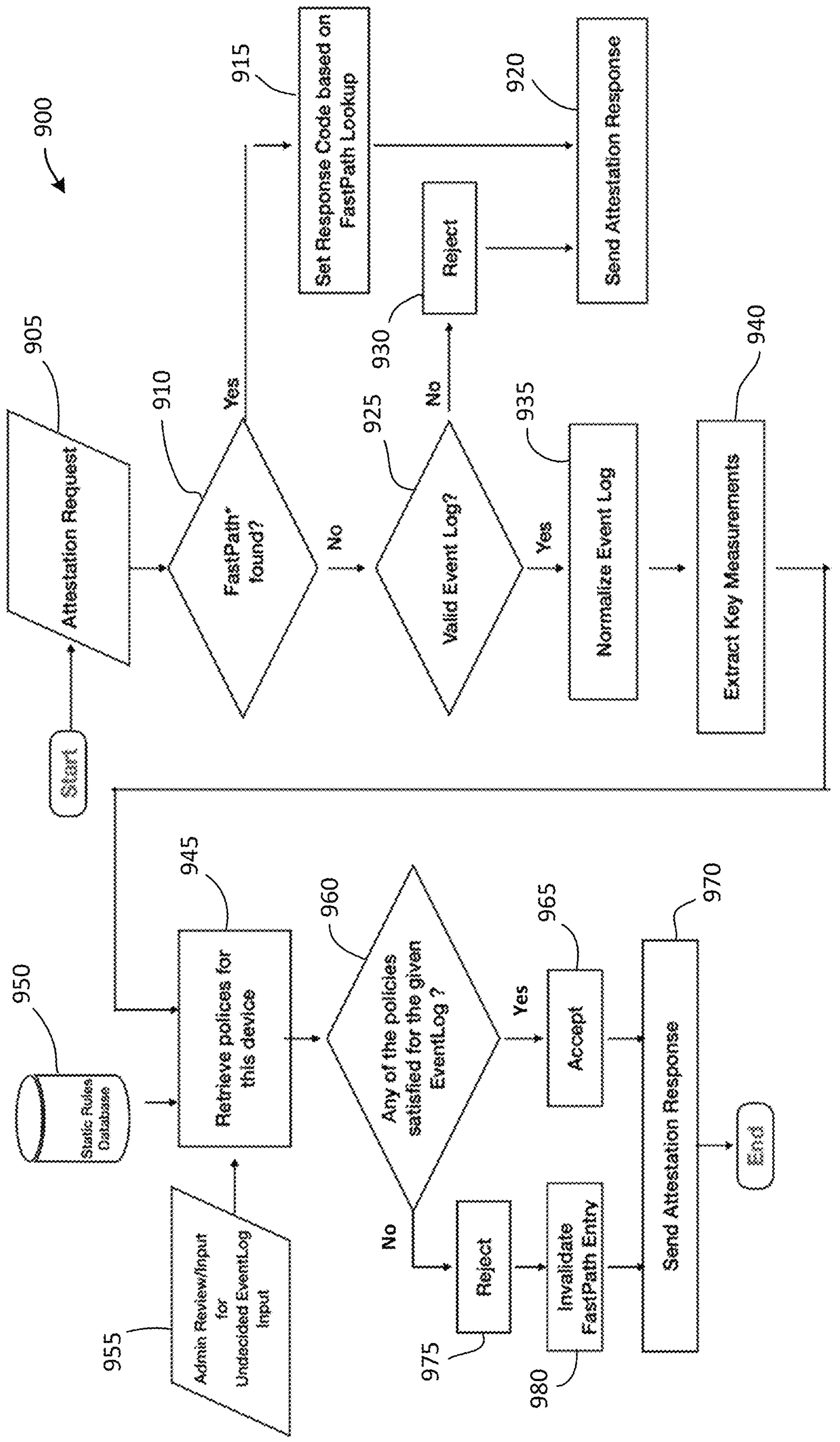
FIG. 9 is a flow diagram depicting aspects of the attestation method of FIG. 8 in greater detail, according to one embodiment.
Figure 10:
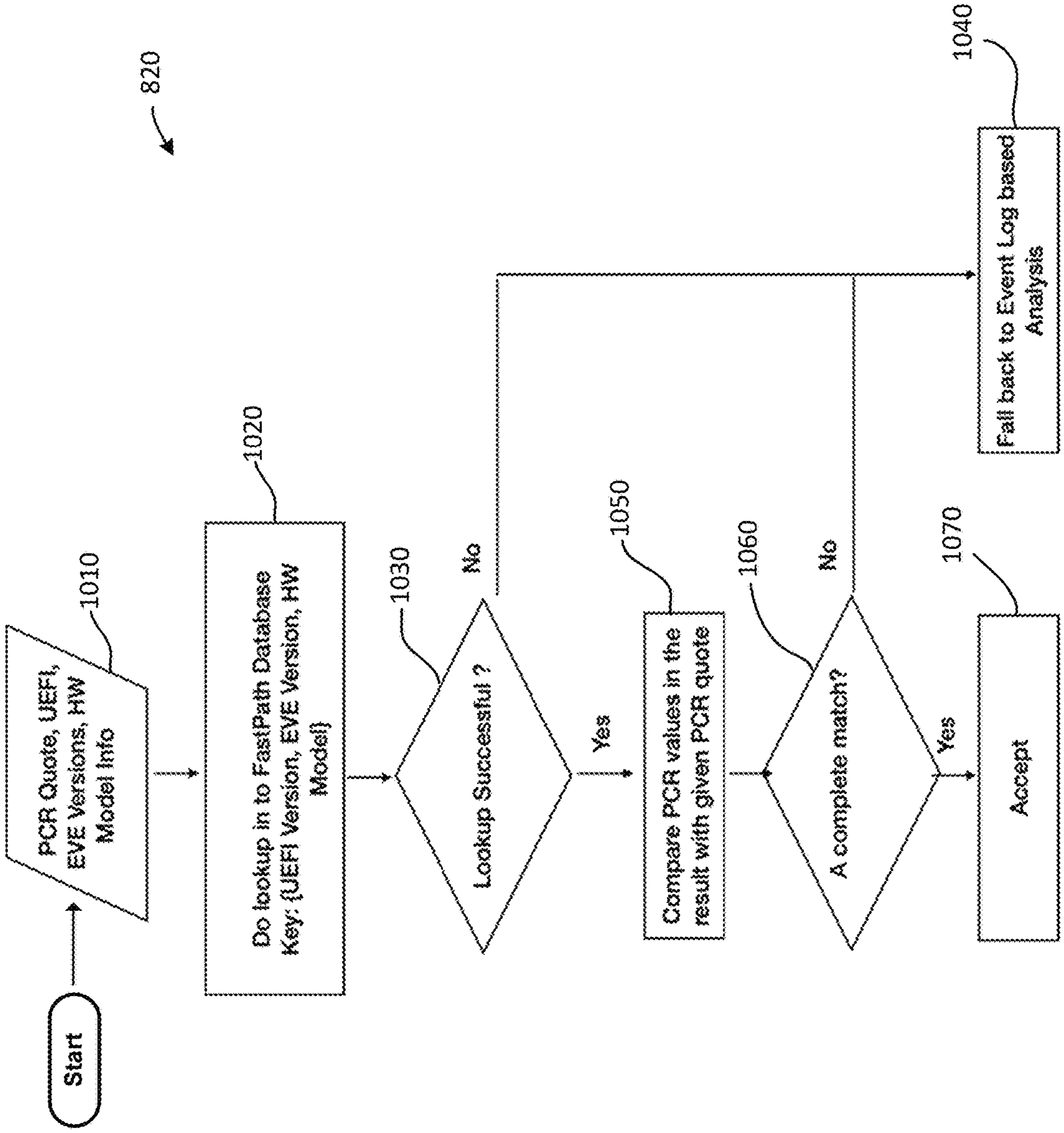
FIG. 10 is a flow diagram depicting the fastpath lookup step of FIG. 8, according to one embodiment.
Figure 11:
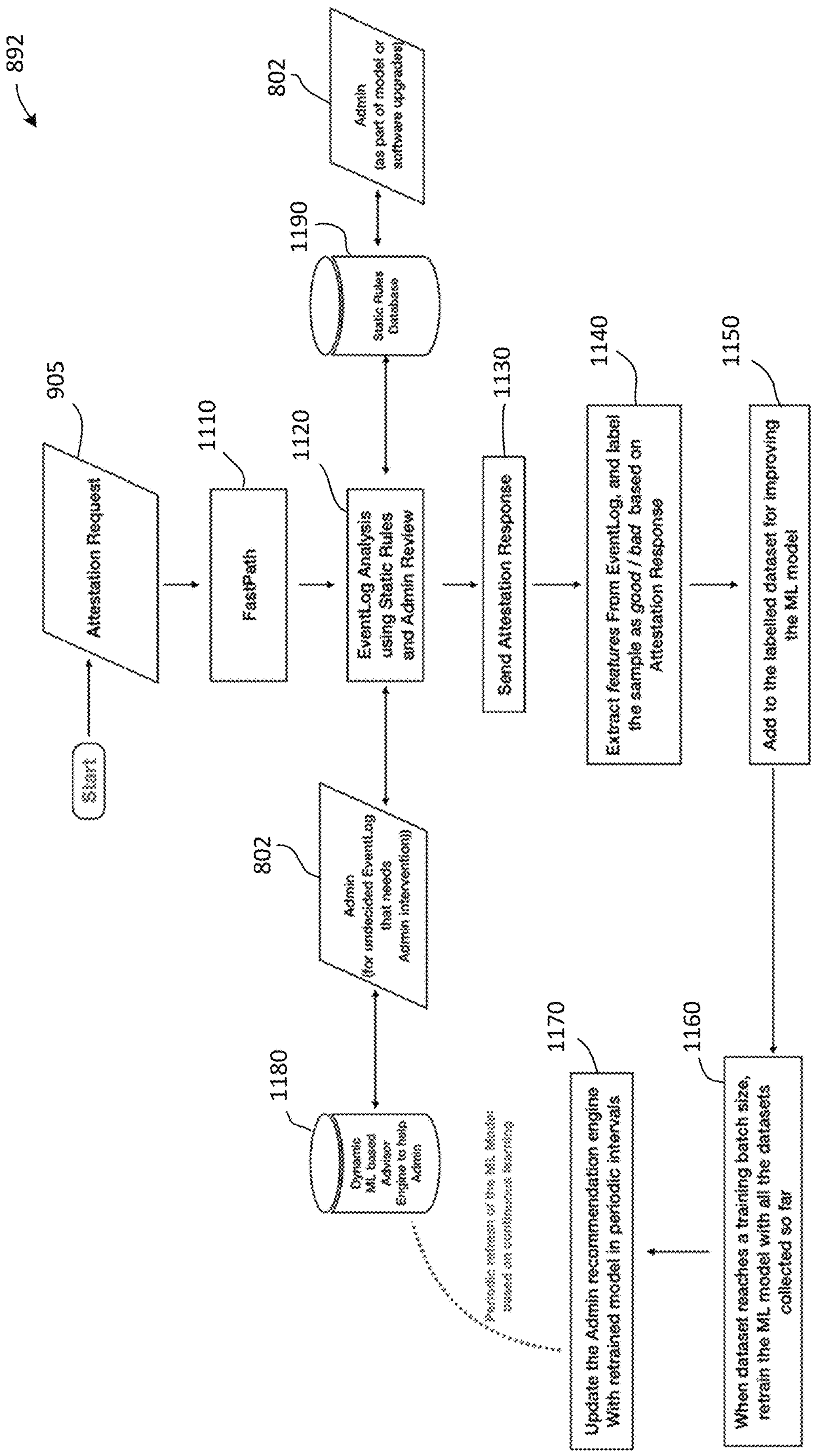
FIG. 11 is a data flow diagram depicting workflow in the machine learning step of FIG. 8, according to one embodiment.

FIG. 8 is a flow diagram depicting an overview of an attestation method 800 according to one embodiment. FIG. 9 is a flow diagram 900 depicting aspects of the attestation method 800 of FIG. 8 in greater detail, according to one embodiment. FIG. 10 is a flow diagram depicting the fastpath lookup step 820 of FIG. 8, according to one embodiment. FIG. 11 is a data flow diagram depicting workflow in the machine learning step 892 of FIG. 8, according to one embodiment.

As shown in FIG. 8, the method 800 may commence with device 101 sending a PCR quote (for example, data from one or more PCRs in TPM 122), along with the Event Log 130, in a step 810. In a step 820, fastpath lookup may be used to compare the PCR quote with the expected PCR values 134. If successful, a positive attestation result may be transmitted in a step 830.

If the fastpath lookup was not successful, the method 800 may proceed to a step 840 in which the Event Log 130 is used. In a step 850, deep inspection of entries of Event Log 130 may be carried out. An administrator 802 may provide user review in a step 860 of the results of deep inspection. Additionally or alternatively, in a step 870, static pre-configured policies (for example, developed through the use of machine learning) may be used to assess results of the deep inspection. Administrator 802 may approve such pre-configured policies, provide inputs to help train the machine learning dataset, and/or otherwise control the policies applied in step 870.

In a step 880, output may be generated, indicating results of the deep inspection. In a step 890, the attestation result may be transmitted back to device 101 to indicate whether device 101 is trustworthy, thereby authorizing, or not authorizing, release of the secret information 126.

Optionally, machine learning models may be trained with attestation results in a step 892. In a step 894, the machine learning models may be used to provide predictions and/or suggestions for the administrator 802 for future attestation requests.

FIG. 9 depicts the method 800 of FIG. 8 in greater detail. As shown, an attestation request 905 may be received, for example, from device 101. Pursuant to a query 910, the attestation engine may determine whether a fastpath to attestation is found. If so, in a step 915, a response code may be generated, indicating results of fastpath lookup. Then, an attestation response may be sent in a step 920.

If the fastpath to attestation was not found in the query 910, another query 925 may ascertain whether the Event Log 130 is valid. If not, attestation may be rejected in a step 930. In the step 920, the response may be sent, indicating rejection of attestation.

If the Event Log 130 is found valid, in a step 935, the Event Log 130 may be normalized in preparation for deep inspection. In a step 940, key measurements (e.g., actual values) may be extracted from Event Log 130. In a step 945, policies (e.g., PCR policy 128) may be retrieved for device 101 and/or the Trusted Controller, which may be server no. The PCR policy 128 may be stored in a static rules database 950 on device 101 and/or server no. Administrator 802 may optionally provide review and/or input 955 to help resolve any undecided values from Event Log 130.

Pursuant to a query 960, a determination may be made as to whether Event Log 130 satisfies any policy or aspect of the PCR policy 128. If so, in a step 965, the attestation request may be accepted, and in a step 970, a corresponding attestation request response may be transmitted. If not, in a step 975, the attestation request may be rejected. In a step 980, the fastpath entry corresponding to the attestation request may be invalidated to avoid future erroneous fastpath attestation. The corresponding attestation response may then be transmitted in the step 970.

FIG. 10 depicts step 820 of FIG. 8 in greater detail. Fastpath lookup may utilize data 1010 such as the PCR quote, UEFI, EVE versions, and hardware model information. In a step 1020, the data 1010 may be looked up in a fastpath database. Pursuant to a query 1030, if the lookup was not successful, in a step 1040, the attestation engine may fall back to event log inspection as described above in connection with FIG. 8.

If lookup was successful, in a step 1050, the attestation engine may compare the PCR values in the result (for example, expected PCR values 134) with the PCR quote. Pursuant to a query 1060, if the comparison yields a complete match, step 820 may yield successful attestation in a step 1070. If not, pursuant to step 1040, the attestation engine may fall back to event log inspection as described above in connection with FIG. 8.

FIG. 11 depicts step 892 of FIG. 8 in greater detail. Attestation request 905 may be received as in FIG. 9. In a step 1110, results of fastpath review may be retrieved. In a step 1120, results of deep inspection of the Event Log 130 may be retrieved and/or shared with the administrator 802. In a step 1130, the attestation response may be retrieved.

In a step 1140, features from the Event Log 130 may be extracted and labeled as "good" or "bad" based on the attestation results. In a step 1150, the labels may be added to the dataset to improve the machine learning model.

When the dataset reaches a training batch size, in a step 1160, the machine learning model may be trained with all the datasets collected thus far. In a step 1170, the admin recommendation engine may be periodically updated with the retrained model to enhance results of the step 894. The step 1170 may serve to update a dynamic machine learning-based advisor engine 1180 that is utilized in the step 894. The dynamic machine learning-based advisor engine 1180 may be used to provide recommendations to administrator 802 pursuant to the step 894 of FIG. 8.

The step 1110 may also reference a static rules database 1190. The administrator 802 may optionally provide input regarding the rules stored in static rules database 1190.

The logical components of FIGS. 8, 9, 10, and ii will be explained in further detail below:

a) The attestation engine that carries out the method 800 of FIG. 8 that may be capable of parsing, extracting, manipulating, and/or analyzing TPM measurement events reported by incoming TPM 2.0 Event Logs, and making an attestation decision based on policies defined by the administrator.

b) The attestation engine may also persistently store Event Logs in a time series database, as they are received, and stored along with the corresponding records for device 101.

c) Once the Event Log 130 has been received from device 101, the attestation engine may first replay the events in the Event Log 130, and compare the final value of each PCR against those in the PCR quote. This is to establish trust in the Event Log 130 for further analysis based on Event Log.

d) Notably, trust in the PCR quote itself may established through a different mechanism of sending a nonce from Edge Controller, followed by TPM directly signing the PCR quote+nonce through a special command meant for signing the quote.

e) Once trustworthiness in the Event Log 130 has been established, the next step may be to extract key portions from the Event Log 130, with a representative (but not complete) list such as the following: a) UEFI digest b) GRUB digest c) Kernel digest and 4) GRUB command lines digest. These portions of the Event Log 130 may be compared with against the expected values 132 for the given {device model, UEFI version, EVE version} tuple reported by device 101. The attestation engine may have a table that maps {device model, UEFI version, EVE version}→{expected digests for various software layers}. This table may replace the prior PCR template-based validation.

f) This new approach may be augmented by reusing the existing PCR quote-based attestation as a fast-path validation, such as via reboots and/or the like. Where there is no change from the last reported PCR quote, the attestation engine can bypass Event Log inspection.

g) The attestation engine may compare specific measurement events in the Event Log 130 with a pre-populated and/or static database of expected measurement digests (i.e., a database containing expected values 132). For example, the attestation engine may pre-populate measurement digests for GRUB binary, Kernel command line and Kernel rootfs and initrd binaries for each of the released OS versions supported on the distributed Edge models.

h) For example, when publishing an EVE release in github, one could bundle the SHAs of its GRUB and kernel for every release. The SHAs themselves may be signed by a GPG key for integrity check. The SHAs may be verified with the GPG keys before accepting them in the database.

i) Similarly, for UEFI SHAs, the attestation engine may pre-populate the database of known measurements with the UEFI SHAs by user-config against specific UEFI Vendor/Revisions. These could be then used to check against the UEFI measurements in the presented Event Log.

j) The attestation engine may also provide an option in the UI to display the occurrences of mismatch found in the evaluation of the Event Log 130, and have an option to accept or reject the attestation request from the UI. This may serve as an administrative control on the verifier logic, and also can help the system mature itself by taking explicit input for unknown/undecided Event Log entries.

k) The attestation engine may also have a dynamic component that provides help to administrators to make approval/disapproval decisions. This may be based on Machine Learning (specifically Deep Neural Networks). The model may be built with features extracted from the Event Logs 130, with the label as the final outcome given by the attestation engine for each of these Event Logs. The attestation engine may also learn and improves its evaluation logic over time based on these administrative decisions, and may start to provide recommendations for unknown/undecided Attestation requests based on its trained model for prediction. This can serve as a helpful tool for administrators to approve/disapprove an undecided case. For example, if the attestation engine does not find a policy for this attestation request in existing databases, it may still be able to inform the admin that it has processed similar requests in the past, so that admin can make an informed decision.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to convey the substance of their work most effectively to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for establishing trustworthiness of an Edge Computing Device, comprising:

at an input device, receiving user input approving attestation;

at one or more storage devices, storing expected values pertaining to aspects of the Edge Computing Device;

at one or more hardware processing devices:

receiving the expected values;

receiving an Event Log from the Edge Computing Device;

extracting actual values from the Event Log; and comparing the actual values with the expected values to determine whether the actual values match the expected values;

at one or more communication devices, responsive to determining that the actual values match the expected values, transmitting an indication that the Edge Computing Device is trustworthy; and at an output device, responsive to determining that the actual values do not match the expected values, providing output indicating a mismatch.

2. The method of claim 1, wherein the expected values are derived independently of the actual values.

3. The method of claim 1, wherein:
determining whether the actual values match the expected values comprises determining that the actual values match the expected values; and
transmitting the indication comprises indicating that the Edge Computing Device is trustworthy; and
the method further comprises, at the one or more communication devices, responsive to transmitting the indication, transmitting secret information stored on the Edge Computing Device.

4. The method of claim 1, further comprising, prior to receiving the expected values:
at the one or more communication devices, receiving the expected values from the Edge Computing Device; and
at the one or more storage devices, storing the expected values.

5. The method of claim 4, wherein storing the expected values comprises generating a database of expected measurement digests of one or more of:
a GRUB binary of each released operating system version of the Edge Computing Device;
a kernel command line of each released operating system version of the Edge Computing Device;
a kernel rootf of each released operating system version of the Edge Computing Device; and
an initrd binary of each released operating system version of the Edge Computing Device.

6. The method of claim 5, wherein:
generating the database of expected measurement digests comprises, for each released operating system version of the Edge Computing Device, storing SHAs of the GRUB and kernel of the released operating system version; and
each of the SHAs is signed by a GPG key.

7. The method of claim 5, wherein:
generating the database of expected measurement digests comprises, for each released operating system version of the Edge Computing Device, storing UEFI SHAs, by user configuration, of the released operating system version; and
comparing the actual values with the expected values comprises comparing UEFI measurements of the Event Log with the UEFI SHAs.

8. The method of claim 4, further comprising, prior to receiving the expected values:
at the one or more communication devices, receiving additional expected values from a plurality of additional Edge Computing Devices;
at the one or more hardware processing devices, generating a database comprising the expected values and the additional expected values; and
at the one or more storage devices, storing the database.

9. The method of claim 8, wherein generating the database comprises organizing the expected values and the additional expected values according to properties of the Edge Computing Device and the additional Edge Computing devices, selected from the group consisting of:
a device model of the Edge Computing Device and the additional Edge Computing devices;
a UEFI version of the Edge Computing Device and the additional Edge Computing devices; and
an EVE version of the Edge Computing Device and the additional Edge Computing devices.

10. The method of claim 1, wherein extracting the actual values from the Event Log comprises extracting one or more of:
a UEFI digest of the Edge Computing Device;
a GRUB digest of the Edge Computing Device;
a kernel digest of the Edge Computing Device; and
a GRUB command lines digest of the Edge Computing Device.

11. The method of claim 1, further comprising:
applying machine learning to the user input and to additional user input from additional attestation requests to generate a recommendation; and
at an output device:
providing additional output indicating an additional mismatch in an additional attestation request; and
presenting the recommendation by indicating whether the additional attestation request should be accepted.

12. A computer-implemented method for establishing trustworthiness of an Edge Computing Device, comprising:
at one or more storage devices, storing expected values pertaining to aspects of the Edge Computing Device;
at one or more hardware processing devices:
receiving the expected values;
receiving an Event Log from the Edge Computing Device;
extracting actual values from the Event Log; and
comparing the actual values with the expected values to determine whether the actual values match the expected values;
at one or more communication devices, responsive to determining whether the actual values match the expected values, transmitting an indication of whether the Edge Computing Device is trustworthy;
at the one or more communication devices, receiving a PCR quote from the Edge Computing Device, the PCR quote containing one or more platform configurable register (PCR) values from the Edge Computing Device; and
at the one or more storage devices, storing the PCR quote.

13. The method of claim 12, further comprising:
at the one or more communication devices, transmitting a nonce; and
at the one or more communication devices, responsive to transmission of the nonce, receiving a signed PCR quote confirming trustworthiness of the PCR quote.

14. The method of claim 12, further comprising, at the one or more hardware processing devices:
replaying events in the Event Log to compute expected PCR values;
comparing the expected PCR values with the one or more PCR values of the PCR quote to determine that the expected PCR values match the PCR values; and
responsive to determining that the expected PCR values match the PCR values, determining that the Event Log is trustworthy.

15. The method of claim 12, further comprising, prior to comparing the actual values with the expected values:
receiving a prior PCR quote containing one or more prior platform configurable register (PCR) values;
comparing the PCR values with the prior PCR values to determine that the PCR values do not match the prior PCR values; and
responsive to determining that the PCR values match the prior PCR values, determining that the actual values are to be compared with the expected values.

16. A non-transitory computer-readable medium for establishing trustworthiness of an Edge Computing Device, comprising instructions stored thereon, that when performed by one or more hardware processing devices, perform the steps of:

causing an input device to receive user input approving attestation;

causing one or more storage devices to store expected values pertaining to aspects of the Edge Computing Device;

receiving the expected values;

receiving an Event Log from the Edge Computing Device;

extracting actual values from the Event Log; and comparing the actual values with the expected values to determine whether the actual values match the expected values;

causing one or more communication devices, responsive to determining that the actual values match the expected values, to transmit an indication that the Edge Computing Device is trustworthy; and causing an output device, responsive to determining that the actual values do not match the expected values, to provide output indicating a mismatch.

17. The non-transitory computer-readable medium of claim 16, wherein the expected values are derived independently of the actual values.

18. The non-transitory computer-readable medium of claim 16, wherein:

determining whether the actual values match the expected values comprises determining that the actual values match the expected values; and transmitting the indication comprises indicating that the Edge Computing Device is trustworthy;

the non-transitory computer-readable medium further comprising instructions stored thereon, that when performed by one or more of the hardware processing devices, perform the step of causing the one or more communication devices, responsive to transmitting the indication, to transmit secret information stored on the Edge Computing Device.

19. The non-transitory computer-readable medium of claim 16, further comprising instructions stored thereon, that when performed by one or more of the hardware processing devices, perform the steps of, prior to receiving the expected values:

causing the one or more communication devices to receive the expected values from the Edge Computing Device; and causing the one or more storage devices to store the expected values.

20. The non-transitory computer-readable medium of claim 19, wherein storing the expected values comprises generating a database of expected measurement digests of one or more of:

a GRUB binary of each released operating system version of the Edge Computing Device;

a kernel command line of each released operating system version of the Edge Computing Device;

a kernel rootf of each released operating system version of the Edge Computing Device; and an initrd binary of each released operating system version of the Edge Computing Device.

21. The non-transitory computer-readable medium of claim 20, wherein:

generating the database of expected measurement digests comprises, for each released operating system version of the Edge Computing Device, storing SHAs of the GRUB and kernel of the released operating system version; and each of the SHAs is signed by a GPG key.

22. The non-transitory computer-readable medium of claim 20, wherein:

generating the database of expected measurement digests comprises, for each released operating system version of the Edge Computing Device, storing UEFI SHAs, by user configuration, of the released operating system version; and comparing the actual values with the expected values comprises comparing UEFI measurements of the Event Log with the UEFI SHAs.

23. The non-transitory computer-readable medium of claim 19, further comprising instructions stored thereon, that when performed by one or more of the hardware processing devices, perform the steps of, prior to receiving the expected values:

causing the one or more communication devices to receive additional expected values from a plurality of additional Edge Computing Devices;

generating a database comprising the expected values and the additional expected values; and causing the one or more storage devices to store the database.

24. The non-transitory computer-readable medium of claim 23, wherein generating the database comprises organizing the expected values and the additional expected values according to properties of the Edge Computing Device and the additional Edge Computing devices, selected from the group consisting of:

a device model of the Edge Computing Device and the additional Edge Computing devices;

a UEFI version of the Edge Computing Device and the additional Edge Computing devices; and an EVE version of the Edge Computing Device and the additional Edge Computing devices.

25. The non-transitory computer-readable medium of claim 16, wherein extracting the actual values from the Event Log comprises extracting one or more of:

a UEFI digest of the Edge Computing Device;

a GRUB digest of the Edge Computing Device;

a kernel digest of the Edge Computing Device; and a GRUB command lines digest of the Edge Computing Device.

26. The non-transitory computer-readable medium of claim 16, further comprising instructions stored thereon, that when performed by one or more of the hardware processing devices, perform the steps of:

applying machine learning to the user input and to additional user input from additional attestation requests to generate a recommendation; and causing an output device to:

provide additional output indicating an additional mismatch in an additional attestation request; and present the recommendation by indicating whether the additional attestation request should be accepted.

27. A non-transitory computer-readable medium for establishing trustworthiness of an Edge Computing Device, comprising instructions stored thereon, that when performed by one or more hardware processing devices, perform the steps of:

causing one or more storage devices to store expected values pertaining to aspects of the Edge Computing Device;

receiving the expected values;

receiving an Event Log from the Edge Computing Device;

extracting actual values from the Event Log;

comparing the actual values with the expected values to determine whether the actual values match the expected values;

causing one or more communication devices, responsive to determining whether the actual values match the expected values, to transmit an indication of whether the Edge Computing Device is trustworthy;

causing the one or more communication devices to receive a PCR quote from the Edge Computing Device, the PCR quote containing one or more platform configurable register (PCR) values from the Edge Computing Device; and causing the one or more storage devices to store the PCR quote.

28. The non-transitory computer-readable medium of claim 27, further comprising instructions stored thereon, that when performed by one or more of the hardware processing devices, perform the steps of:

causing the one or more communication devices to transmit a nonce; and causing the one or more communication devices, responsive to transmission of the nonce, to receive a signed PCR quote confirming trustworthiness of the PCR quote.

29. The non-transitory computer-readable medium of claim 27, further comprising instructions stored thereon, that when performed by one or more of the hardware processing devices, perform the steps of:

replaying events in the Event Log to compute expected PCR values;

comparing the expected PCR values with the one or more PCR values of the PCR quote to determine that the expected PCR values match the PCR values; and responsive to determining that the expected PCR values match the PCR values, determining that the Event Log is trustworthy.

30. The non-transitory computer-readable medium of claim 27, further comprising instructions stored thereon, that when performed by one or more of the hardware processing devices, perform the steps of, prior to comparing the actual values with the expected values:

receiving a prior PCR quote containing one or more prior platform configurable register (PCR) values;

comparing the PCR values with the prior PCR values to determine that the PCR values do not match the prior PCR values; and responsive to determining that the PCR values match the prior PCR values, determining that the actual values are to be compared with the expected values.

31. A system for establishing trustworthiness of an Edge Computing Device, comprising:

an input device, configured to receive user input approving attestation;

one or more storage devices, each configured to store expected values pertaining to aspects of the Edge Computing Device;

one or more hardware processing devices, communicatively coupled to the input device and to the one or more storage devices, configured to:

receive the expected values;

receive an Event Log from the Edge Computing Device;

extract actual values from the Event Log; and compare the actual values with the expected values to determine whether the actual values match the expected values; and one or more communication devices, communicatively coupled to the one or more hardware processing devices, configured to, responsive to determining whether the actual values match the expected values, transmit an indication that the Edge Computing Device is trustworthy; and an output device, communicatively coupled to the one or more hardware devices, configured to, responsive to determining that the actual values do not match the expected values, provide output indicating a mismatch.

32. The system of claim 31, wherein the expected values are derived independently of the actual values.

33. The system of claim 31, wherein:

determining whether the actual values match the expected values comprises determining that the actual values match the expected values;

transmitting the indication comprises indicating that the Edge Computing Device is trustworthy; and the one or more communication devices are further configured to, responsive to transmitting the indication, transmit secret information stored on the Edge Computing Device.

34. The system of claim 31, wherein:

the one or more communication devices are further configured to, prior to receiving the expected values, receive the expected values from the Edge Computing Device; and the one or more storage devices, are further configured to, prior to receiving the expected values, store the expected values.

35. The system of claim 34, wherein storing the expected values comprises generating a database of expected measurement digests of one or more of:

a GRUB binary of each released operating system version of the Edge Computing Device;

a kernel command line of each released operating system version of the Edge Computing Device;

a kernel rootf of each released operating system version of the Edge Computing Device; and an initrd binary of each released operating system version of the Edge Computing Device.

36. The system of claim 35, wherein:

generating the database of expected measurement digests comprises, for each released operating system version of the Edge Computing Device, storing SHAs of the GRUB and kernel of the released operating system version; and each of the SHAs is signed by a GPG key.

37. The system of claim 35, wherein:

generating the database of expected measurement digests comprises, for each released operating system version of the Edge Computing Device, storing UEFI SHAs, by user configuration, of the released operating system version; and comparing the actual values with the expected values comprises comparing UEFI measurements of the Event Log with the UEFI SHAs.

38. The system of claim 34, wherein, prior to receiving the expected values:

the one or more communication devices are further configured to, prior to receiving the expected values, receive additional expected values from a plurality of additional Edge Computing Devices;

the one or more hardware processing devices are further configured to, prior to receiving the expected values, generate a database comprising the expected values and the additional expected values; and the one or more storage devices are further configured to, prior to receiving the expected values, store the database.

39. The system of claim 38, wherein generating the database comprises organizing the expected values and the additional expected values according to properties of the Edge Computing Device and the additional Edge Computing devices, selected from the group consisting of:

a device model of the Edge Computing Device and the additional Edge Computing devices;

a UEFI version of the Edge Computing Device and the additional Edge Computing devices; and an EVE version of the Edge Computing Device and the additional Edge Computing devices.

40. The system of claim 31, wherein extracting actual values from the Event Log comprises extracting one or more of:

a UEFI digest of the Edge Computing Device;

a GRUB digest of the Edge Computing Device;

a kernel digest of the Edge Computing Device; and a GRUB command lines digest of the Edge Computing Device.

41. The system of claim 31, wherein the one or more hardware processing devices are further configured to apply machine learning to the user input and to additional user input from additional attestation requests to generate a recommendation, the system further comprising:

an output device, communicatively coupled to the one or more hardware devices, configured to perform the steps of:

providing additional output indicating an additional mismatch in an additional attestation request; and presenting the recommendation by indicating whether the additional attestation request should be accepted.

42. A system for establishing trustworthiness of an Edge Computing Device, comprising:

one or more storage devices, each configured to store expected values pertaining to aspects of the Edge Computing Device;

one or more hardware processing devices, communicatively coupled to the one or more storage devices, configured to:

receive the expected values;

receive an Event Log from the Edge Computing Device;

extract actual values from the Event Log; and compare the actual values with the expected values to determine whether the actual values match the expected values; and one or more communication devices, communicatively coupled to the one or more hardware processing devices, configured to:

responsive to determining whether the actual values match the expected values, transmit an indication of whether the Edge Computing Device is trustworthy; and receive a PCR quote from the Edge Computing Device, the PCR quote containing one or more platform configurable register (PCR) values from the Edge Computing Device;

and wherein the one or more storage devices are further configured to store the PCR quote.

43. The system of claim 42, wherein the one or more communication devices are further configured to perform the steps of:

transmitting a nonce; and responsive to transmission of the nonce, receiving a signed PCR quote confirming trustworthiness of the PCR quote.

44. The system of claim 42, wherein the one or more hardware processing devices are further configured to perform the steps of:

replaying events in the Event Log to compute expected PCR values;

comparing the expected PCR values with the one or more PCR values of the PCR quote to determine that the expected PCR values match the PCR values; and responsive to determining that the expected PCR values match the PCR values, determining that the Event Log is trustworthy.

45. The system of claim 42, wherein the one or more hardware processing devices are further configured to perform the steps of, prior to comparing the actual values with the expected values:

receiving a prior PCR quote containing one or more prior platform configurable register (PCR) values;

comparing the PCR values with the prior PCR values to determine that the PCR values do not match the prior PCR values; and responsive to determining that the PCR values match the prior PCR values, determining that the actual values are to be compared with the expected values.

* * * * *